United States Patent [19]
Sinclair

[11] 3,818,865
[45] June 25, 1974

[54] ANIMAL COMMODE

[76] Inventor: Suzanne E. Sinclair, 186 9th Ave., New York, N.Y. 10011

[22] Filed: Nov. 21, 1972

[21] Appl. No.: 308,396

[52] U.S. Cl. .............................................. 119/1
[51] Int. Cl............................................ A01k 29/00
[58] Field of Search ...................................... 119/1

[56] References Cited
UNITED STATES PATENTS

| | | | |
|---|---|---|---|
| 3,141,441 | 7/1964 | Russell.................................... | 119/1 |
| 3,227,137 | 1/1966 | Goldman et al. ...................... | 119/1 |
| 3,339,527 | 9/1967 | Burroughs.............................. | 119/1 |

Primary Examiner—Hugh R. Chamblee
Attorney, Agent, or Firm—Morgan, Finnegan, Durham & Pine

[57] ABSTRACT

A conveniently assembled and disassembled, portable commode or toilet accessory for domestic pets includes a pair of base members slidably received about and carrying an inner tray frame, a flexible, dished tray removably mounted on and within the tray frame, and a foraminous screen removably mounted above the flexible dished tray. Shield walls provided around the sides of the commode receive animal fluid excretions deposited thereupon and either collect such excretions or transmit them to the screen, where much of the fluid excretions are also deposited directly, from where they pass to the dished tray. Preferably, accumulated solid and fluid wastes on the screen and fluid wastes collected on the shield walls are flush-cleaned onto the dished tray and the latter is, in turn, flush-cleaned into a conventional toilet bowl. Upon disassembly, the elements of the commode can also be readily packed into a single, conveniently portable container or carrying case.

17 Claims, 7 Drawing Figures

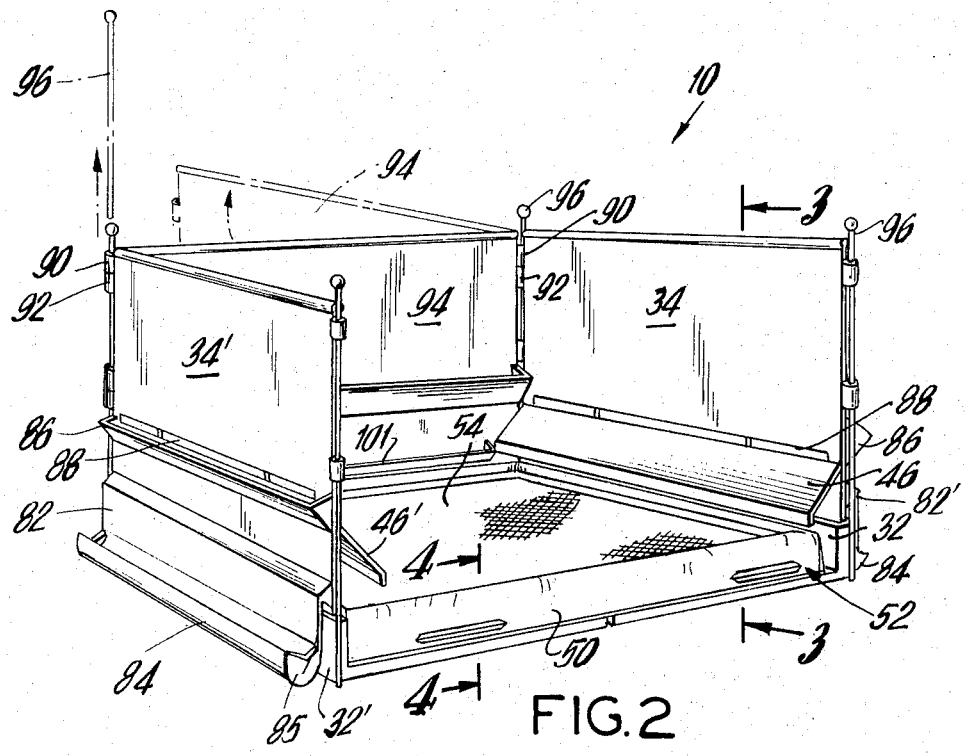
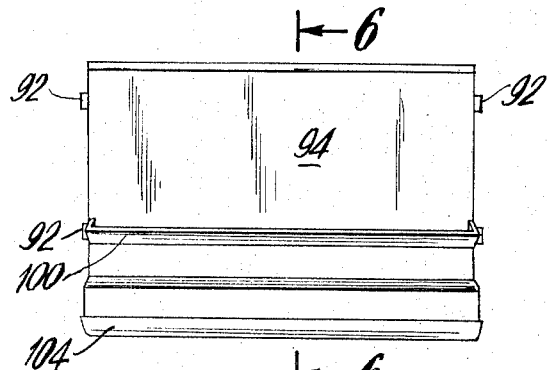
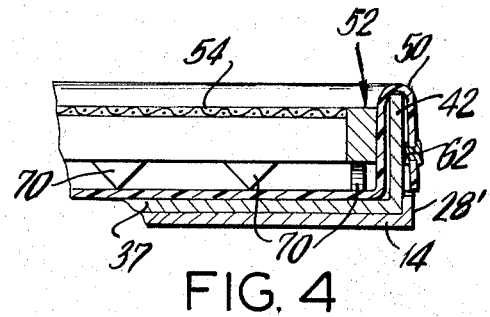
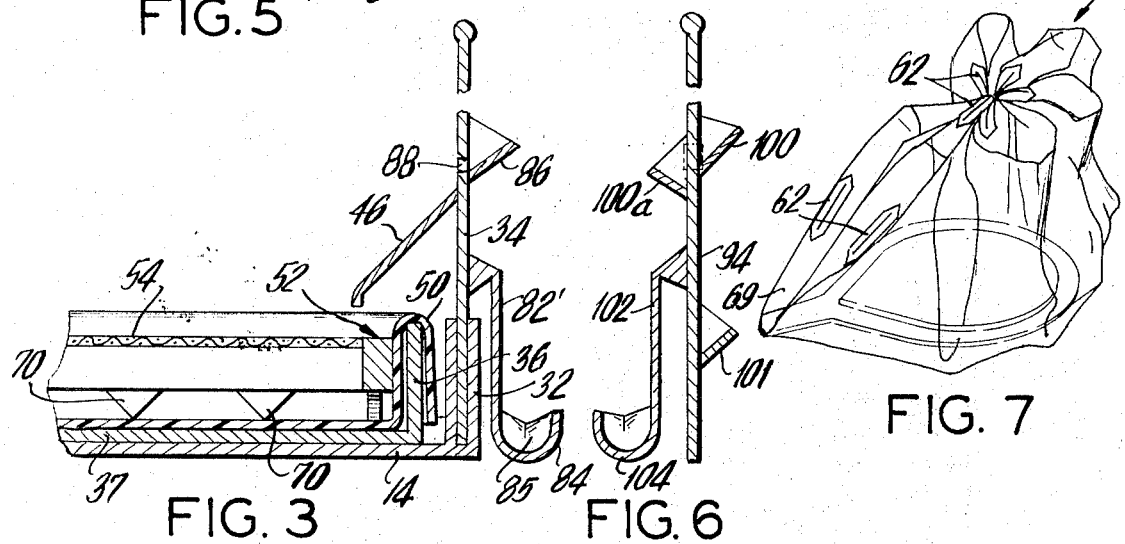

ANIMAL COMMODE

BACKGROUND AND OBJECTS OF THE INVENTION

This invention relates to an animal commode or toilet accessory for use within a house, hotel or other building where domestic animals, and particularly pets, are maintained and it is desired that they limit their excretions to a confined area where the excreta, such as urine and feces, are deposited and collected for easy disposal, such as in a conventional toilet bowl, while minimizing contamination of the immediate environment.

It has been known heretofore to provide sanitary facilities for pets that embrace the use of grills mounted on toilet bowls or in other assemblies. It has also been known to use a pan of flexible material mounted upon a frame for reception of animal discharge. However, all of these prior devices known to me suffer from one or more disadvantages of being inconvenient or obtrusive in use, ineffective to collect all animal excreta, difficult to train animals in their usage, difficult to clean, lacking in portability or difficult to assemble and disassemble and expensive to manufacture.

The present invention provides a unique and improved combination of the aforementioned and other interrelated features, designed to provide convenient, unobtrusive, effective containment and easy disposal of animal excreta in a readily assembled and disassembled apparatus. The particular arrangement provided by this invention permits retention of animal excreta in the device with reduced likelihood of accumulated excrement being carried by the animal into surrounding areas while providing means for easy, either partial or complete, dissociation of the components of the total assembly for disposal of accumulated excrement, cleaning or transport.

It is therefore an object of this invention to provide a new and improved animal commode.

Another object of this invention is to provide a new and improved animal commode which eliminates the disadvantages and drawbacks of previously known sanitary facilities for pets.

A further object of this invention is to provide a new and improved animal commode which is characterized by its ease of assembly and disassembly for purposes of cleaning and/or transport.

Another object of this invention is to provide a new and improved animal commode which may be assembled and disassembled without the use of threaded or complex fastening means and yet forms a sturdy structure when assembled.

A further object of this invention is to provide a new and improved animal commode which may be easily and economically cleaned and does not require the use of any absorbent material or other replacement part.

Another object of this invention is to provide a new and improved animal commode which prevents the discharge of animal excreta to the area surrounding the commode.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

The present invention is directed to a new and improved animal commode which is characterized by its ease of assembly for use and subsequent disassembly for cleaning or transportation.

Briefly described, as preferably embodied, the animal commode of the invention includes a base member composed of two identical half-sections each comprising a horizontal bottom wall having side guidewalls and a vertical wall at one end containing an elongated slot therein, the half-sections being arranged so that the end walls are in opposed, remotely spaced relationship to one another; a tray frame carried by said base member and received between said side guidewalls so that the base half-sections may be telescopically slidably positioned with their opposed end walls contiguous to or spaced from the corresponding ends of the tray frame; a flexible pick-up tray disposed within the tray frame adapted to be formed into a bag having a discharge spout, the flexible tray having handle portions which drape over the outer edges of the tray frame and a central stiffened receptacle portion; a screened platform telescopically received within the tray frame and resting on the flexible pick-up tray; a pair of opposed end shield walls slidably received in the opposed slotted end walls of said base member, each end shield wall having upper and lower urine-collecting troughs on the outer surface thereof and a urine deflecting flange on the inner surface thereof overhanging said platform, the outer upper troughs of the end walls communicating with the inner deflecting flange; and a side shield wall hingedly connected to said end shield walls, said side shield wall carrying inner and outer urine-collecting troughs.

In use, it will be seen that any urine deposited against either the inside or outside of either of the end shield walls or the side shield wall will be collected in a trough or will drain onto the screened platform and thence to the flexible pick-up tray. Feces deposited on the screened platform is retained there.

The cleaning operation preferably is as follows, assuming both end shield walls and one side shield wall are set up for use (one side by choice is left open to let a pet enter the commode) and that all parts have been soiled:

1. The side shield wall is disconnected from each of the end shield walls by removal of the hinge pins and any urine contained in the various troughs carred by the shield walls is poured onto the screened platform where it drains onto the pick-up tray. Advantageously, the troughs are then suitably flushed with water, as from a pitcher, while positioned diagonally and tilted downwardly toward the platform.

2. The screened platform is then picked up by the handle and tilted downwardly over the pick-up tray and flushed with water to remove feces and to clean any urine previously deposited above and immediately under the platform screen. The screened platform is thereafter completely lifted and removed from the commode. Advantageously, the cleaned platform may be temporarily placed in the trough behind one end shield wall and permitted to rest against the shield wall during the remaining cleaning operations.

3. The base members are then slid apart a sufficient distance to facilitate the removal of the pick-up tray.

4. The handles of the pick-up sheet are then individually grasped and gathered together thereby forming a bag having a discharge spout, whereupon the bag is carried to a toilet bowl where the contents thereof are poured out of the spout formed by the stiffened central portion of the pick-up tray into the toilet bowl. Thereafter, the pick-up tray may be flush-cleaned once or twice, as by water from a pitcher, and the flush water poured directly into the toilet bowl.

5. The parts of the commode are now fully clean and ready for reassembly.

6. It will be understood that at any one of the aforedescribed cleaning stages, if necessary, a sponge attached to a handle and liquid soap may be used in the event that a more thorough cleaning is required.

It will of course be understood that the commode of this invention will also operate satisfactorily with less than all of the shield walls mounted in place, particularly for usage by female animals, and that only one shield wall is necessary for an appropriately trained male dog. Thus, if one or more of the shield walls has not been soiled, or has not been erected for usage, it will be understood that the cleaning operation is shortened accordingly.

It will be apparent from the foregoing description that the objects of the invention specifically enumerated herein are accomplished by the invention as preferably embodied.

Thus, the provision of the side and end shield walls with their combination of inner and outer troughs and deflectors ensures an effective containment of all fluid excreta, even from male dogs. Complete assembly and disassembly is convenient, quick and easy, requiring only the insertion or withdrawal of hinge pins and the shield walls in sleeves or slotted members. Cleaning is similarly convenient and sanitary. Thus, a pick-up tray permits all parts to be flush-cleaned at the site of the commode and its adaptability to be formed into a bag having a discharge spout eases transport and subsequent neat disposal of the contents into a toilet bowl without spillage and without soiling the hands. The interrelated parts of the commode are all designed for inexpensive manufacture and combine to form an attractive and sanitary facility.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

BRIEF DESCRIPTION OF THE DRAWINGS

FIG. 2 is a perspective view illustrating the apparatus of FIG. 1, exclusive of the cover, in the assembled state for use as an animal commode.

FIG. 3 is an enlarged, fragmentary, vertical sectional view partly in elevation, taken along line 3—3 in FIG. 2.

FIG. 4 is an enlarged, fragmentary vertical sectional view, partly in elevation, taken along line 4—4 of FIG. 2.

FIG. 5 is an elevational view of the side shield panel illustrated in FIGS. 1 and 2.

FIG. 6 is a vertical section taken along line 6—6 in FIG. 5.

FIG. 7 is a perspective view of the pick-up tray after it has been formed into a bag for transport to a conventional toilet bowl for discharge of the contents thereof and cleaning.

DESCRIPTION OF THE PREFERRED EMBODIMENT

Figure 1:
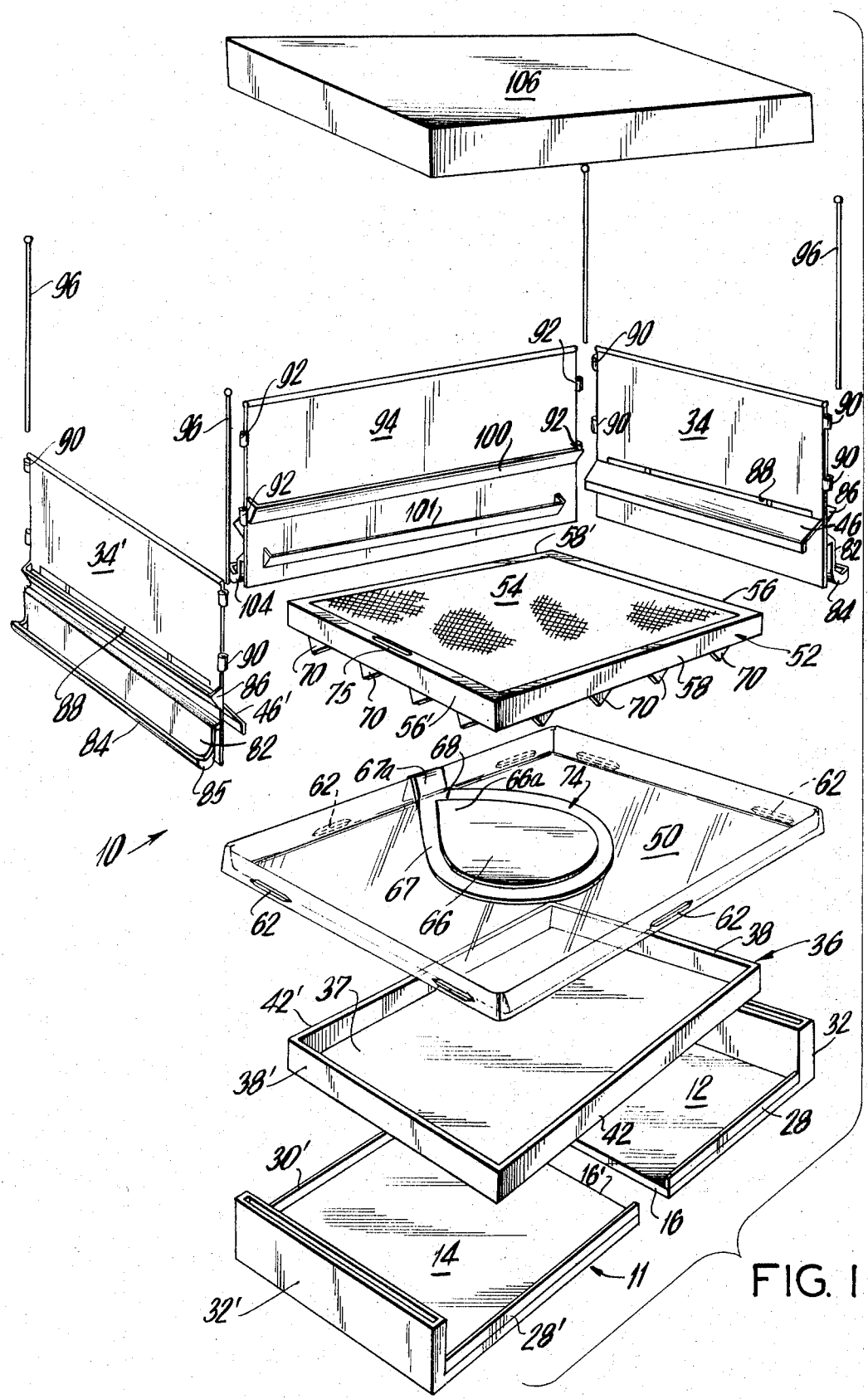
FIG. 1 is an exploded perspective view illustrating an animal commode assembly constructed in accordance with the invention.

Referring now more particularly to the preferred embodiment of the invention shown in the accompanying drawings, there is illustrated an animal commode or sanitary station 10, which includes a base or floor 11 composed of two normally quadrangular, e.g. square or rectangular, flat base members 12 and 14 of equal size which are adapted to abut in a horizontal plane along their inner margins 16 and 16' in the assembled state.

The base members 12, 14 contain guides or slideways disposed parallel to and adjacent each of their lateral borders, such as shown at 28, 28' and 30', to provide a continuous uninterrupted guide surface when the inner margins or borders 16 and 16' of the base members 12, 14 are in a contiguous state. Along the remaining outer or end margins of the base elements 12, 14, disposed substantially parallel to the inner margins 16 and 16', are mounted vertically disposed end walls 32, 32', respectively, each being slotted and open at the top for slidably receiving the end shield walls or panels 34, 34', respectively, more fully described hereinafter.

A tray frame 36 is provided to rest upon the floor 11 comprised of base members 12, 14 and is advantageously formed of a plurality, usually four, of vertically aligned ribs, comprising end ribs 38, 38' and side ribs 42, 42', advantageously suitably secured to a bottom 37. Frame 36 therefore defines a walled enclosure and has a configuration conforming generally to the margins of the floor 11. The lateral margins or walls 42, 42' are adapted to be slidably received within the frame guide surfaces extending upwardly from the floor 11, as shown at 28, 28' and 30', to thereby guide the elements 12 and 14 to and away from their abutting relationship, as previously described.

Advantageously, the bottom or floor 37 of frame 36 is formed of a non-porous, liquid-impervious material, preferably plastic sheeting, and preferably is opaque, as shown.

The presence of a tray frame bottom 37 facilitates removal of the elements supported by the frame, described in detail hereinafter, in which the excrement is accumulated and provides a secondary receptacle for waste during cleaning. Thus, should an accident occur during removal, the waste will tend to fall into the frame bottom 37, where it will be confined, rather than onto the base members 12, 14 or onto the floor of the dwelling in which the commode 10 is kept for use, for, as will be apparent from the following discussion, the elements 12, 14 are parted for ease of access when the commode is being cleaned.

Disposed upon the tray frame 36 is a flexible, preferably smooth, liquid-impervious dished tray 50. Tray 50 is preferably made, by way of illustration, from a vinyl sheet material such as polyvinyl chloride. Alternatively, other equivalent flexible synthetic plastic film materials may be satisfactorily used. Tray 50 provides the primary receptacle upon which the animal excrement is accumulated for disposal.

The tray or sheeting 50 is of such size, dimension, suppleness and fit that it will fold over the inner and outer margins of the ribs 38, 38' and 42, 42' of frame ribs thereby forming the tray's rim, so as to accommodate the telescopic insertion of a platform 52 incorporating a foraminous screen 54, being placed onto the flexible tray 50 and thence into frame 36. The edge portions of tray 50 thus provide an interface between the rigid ribs 38, 38' and 42, 42' of the frame 36 and the corresponding margins 56, 56' and 58, 58' of platform 52, as described more particularly hereafter.

Adjacent the outer margins of tray 50, the sheet is advantageously provided with slotted and suitably reinforced handles or hand-holds 62 for removal of the tray 50 with its accumulated deposits of waste. Handles or hand-holds 62 are preferably reinforced, such as by an opaque material, for example, vinyl sheet material or an equivalent flexible synthetic plastic film material. In the assembled state, handles or handholds 62 are disposed about the outer margin of the ribs 38, 38' and 42, 42' of frame 36, so that waste deposits will not soil the handles or permit passage of waste from the tray 50 into the bottom of the frame.

Advantageously, tray 50 is produced as a fitted or contoured sheet, the corners of which are split and thus adapted to conform to the structure of frame 36 and platform 52.

In accordance with the invention, and as here preferably embodied, tray 50 includes a relatively rigid, flat, generally circular, surface 66 mounted onto a correspondingly shaped, flexible reinforcing section 67 disposed centrally of the tray. The reinforcing section 67 includes a tongue 67a which extends to an outer margin of the tray and is adapted to fold over the rim of the tray frame, as illustrated in FIG. 1. The relatively rigid surface 66 includes a pointed portion 66a which overlaps a portion of tongue 67.

It will be apparent from the foregoing that, upon gathering together the handles 62, tray 50 is thereby formed into a bag-like configuration as seen in FIG. 7, surface 66 generally approximately a bottom floor for the bag and tongue 67a forming a discharge spout 69. Thus, the accumulated waste tends to assemble towards the center of the tray upon being formed into a bag, and proceeds along the discharge spout for deposition into a conventional toilet.

As previously mentioned, the tray 50 normally lays over the bottom of the tray frame 36 and underneath the legs 70 of the platform 52. The margins of the tray are sustained in position by the frictional force of the platform walls 56, 56' and 58, 58' impressed against the ribs 38, 38', 42, 42' of the tray frame 36 by the telescopic mount therein. The tray 50 may, of course, be fitted and formed of sufficiently rigid material to obtain the desired relationship. Other means of securing the desired result will be evident in the discussion that follows.

Each of the surfaces 66 and 67 may also suitably be formed from vinyl materials, or other equivalent synthetic plastic materials, having the desired degree of flexibility or rigidity, as the case may be. Also, surfaces 66 and 67 are advantageously laminated together and surface 66, in turn, laminated to the material forming the main tray 50.

Foraminous screen 54 is stretched flush between the side walls 56, 56', 58, 58' of the platform 52 to present a flat, horizontal surface upon which the animal is trained to urinate or defecate. The screen must, therefore, be of sufficient strength to support the animals using the commode 10. The mesh size and construction may, of course, vary so long as it is adequate to retain the animal, while passing the fluid excretions. The "Union Jack" mesh design has been found most desirable and is preferred for use in the construction of screen 54.

Advantageously, a suitable handle 75 is secured to or cut out of the margin of the upper surface of the platform 52, for use in removing the platform from the commode so that it may be conveniently emptied of retained fecal matter thereon.

Platform 52 rests within frame 36 most desirably by means of a plurality of legs 70, previously mentioned, which are disposed at regular intervals about side walls 56, 56', 58, 58' of the platform. In the assembled state, legs 70 advantageously rest on the bottom 37 of the frame 36, and the distal ends of the legs to thus abut the interior surface of dished tray 50 adjacent the tray's outer perimeter. Each of legs 70 is advantageously integrally attached at its upper end to the sidewalls 56, 56', 58 and 58' of platform 52 and is preferably contracted at the distal end to present as small a surface area as possible consistent with the support which the leg is intended to provide. This is to minimize contamination with waste deposits within the tray 50.

The end shield walls 34, 34' are preferably identical in structure, and may vary in height as desired, the proportions depending upon the size of the animal to be accommodated. Lower walls are permissible where smaller dogs are intended to use the commode 10, while higher walls are desired where larger male dogs are using the facility. Indeed, end shield walls 34, 34' are specially adapted to accommodate use by male dogs, and serve to hide the horizontal platform area from view. As previously mentioned, although the shield walls are not necessary for female dogs, they are nevertheless advantageous in defining the restricted area to be used by the dog and intending to conceal the platform, where solid fecal matter is retained, from view.

Thus, end shield walls 34 and 34' are rectangular in shape, and the lower end of each is adapted for slidable insertion into the slots formed in the base end walls 32, 32', respectively, where the shield walls receive vertical support and attain a defined inter-relationship with the remainder of the commode assembly 10. Depending flanged support elements 82 are integrally attached to, and extend downwardly and outwardly from the outer surfaces of, each of the end shield walls 34 and 34'. Advantageously, flanges 82 extend to the floor upon which the commode 10 is disposed, thus further bracing the end shield walls 34 and 34' in a secure upright position. Flanges 82 terminate in curved troughs 84 at their ends remote from their attachment to the shield walls and receive any residue of urine deposited, for example, by a male dog, on the upper outer surfaces of the shield walls and not otherwise introduced into the interior of the commode, as described hereinafter. Advantageously, the ends 85 of troughs 84 are inclined upwardly and outwardly to form a spout to facilitate removal of urine deposited therein.

A second horizontally disposed elevated trough 86 is also mounted on the outer surface of each of the end shield walls 34 and 34'. Trough 86, like the lower trough 84, is closed at both ends to retain any urine deposited therein. Advantageously, upper trough 86 is connected directly to the outer surface of each end shield wall 34 and 34', and thus more nearly adjacent the wall's surface than that of trough 84, positioned at the distal end of the flange 82. Just above the point of attachment of trough 86 to the outer surface of the walls 34 and 34', there is formed an orifice 88 extending through the walls 34 and 34' along the length of the trough. Thus, urine deposited by a male dog in trough 86 is passed through opening or orifice 88 onto the inclined drain plates 46, 46' and thence onto screen 54 of platform 52 and into tray 50.

Drain plates 46, 46' are integrally connected to the interior sides, and extend horizontally the length of, each of the walls 34 and 34', the plane of attachment being immediately below the level defined by the aforesaid orifice 88.

Advantageously, and as here preferably embodied, the vertical edges of end shield walls 34 and 34' are provided with sleeves 90 which are intended to appropriate register with similar sleeves 92 provided on adjacent vertical edges of side shield wall 94, more fully described hereinafter, to provide a conduit for pins 96 and a hinged connection between side shield wall 94 and end shield walls 34 and 34'. In this manner, the side shield wall 94 is maintained in readily dismountable relationship to the remainder of the commode while providing a decorative and protective wall for reflecting or receiving animal wastes being deposited in the commode 10. In the mounted state, side shield wall 94 rests on the dwelling floor and abuts the side margins and guideways of the base members 12, 14, along with the outer overlapping margin of the tray or sheet 50.

To assure the collection of urine excrement which may be deposited onto the interior surface of the side shield wall 94, upper and lower troughs 100, 101 are secured thereto, trough 101 being particularly intended for use by a small male dog. Also, a dependent support flange 102, similar to flanges 82 projects from the outer surface of the side wall and terminates adjacent the dwelling floor in a trough 104 in a manner similar to that of troughs 84.

The side of the commode 10 opposite side shield wall 94 may optionally be provided with a similar shield wall (not shown), mounted in the same manner as shield wall 94. These walls can be used as gates, to be opened and closed for entry into the commode, or to bar such entry when not desired.

A cover 106, shown in FIG. 1, preferably made of a suitable, substantially rigid, plastic material, may be provided to cover the commode in its assembled state. Alternatively, when removed from the assembly and turned upside down and filled with a pad, it may provide a bed for the animal. Also, the cover is used for storing and carrying the assembly when disassembled.

The apparatus may, as indicated above, be readily "knocked down" for cleaning or packing in a substantially side-by-side relationship of parts in a suitable carrying case, such as cover 106.

The extent to which the commode is disassembled at any time is selective, as noted above. Thus, upon removal of the pin 96 from one end of the side shield wall 94, the end shield walls or panels 34 and 34' can be moved to permit access for manual removal of the platform 52, tray 50 and frame 36 from the commode assembly 10.

Tray 50 should be of sufficient tensile strength to permit removal thereof with a good amount of flushing water contained thereon and carrying a short distance, as to a toilet bowl, for disposal. The most convenient means for removing waste from the components 50 and 52 is to pick up platform 52 by handhold 75 and flushing the excreta therefrom with water onto the tray 50. Thereafter, as previously described, the hand-holds 62 of the tray 50 are grasped and gathered together to form a bag in which the waste material is concentrated on the relatively rigid central portion 66. The departure of the waste into a toilet bowl or other means is then conveniently accomplished by flushing the waste from the bag through the discharge spout 69. It is not essential to remove the tray frame 36, unless it is desired to clean the assembly 10 thoroughly, or unless, by accident, excreta has spilled into the tray frame.

The commode 10 may be made of a variety of liquid-impervious, non-staining materials. A light metal sheet material, such as aluminum, is appropriate for example, for all of the components, including, if desired, the tray 50, if a fitted sheet is used. The screen 54, of course, is an exception in that it should be formed of wire, or, less desirably, polyester fiber or the like. Ceramic or rubberized materials, conventional engineering plastics, wood, glass and the like can also be desirably used to form the panels, ribs, floor and base elements of the assembly. The cover is preferably formed of a resilient or at least non-metallic material.

In addition, although the commode 10 has been shown as rectangular, it will be understood that oval, round, square or other conformations may also be used.

It will be evident that the terms and expressions which have been employed are used as terms of description and not of limitation. There is no intention in the use of such terms and expressions of excluding equivalents of the features shown and described or portions thereof.

Thus, the invention in its broader aspects is not limited to the specific embodiments herein shown and described but departures may be made therefrom within the scope of the accompanying claims, without departing from the principles of the invention and without sacrificing its chief advantages.

What is claimed is:

1. An animal commode, comprising:
   a tray frame having upwardly extending side and end walls;
   a thin, flexible, liquid-impervious, generally flat tray member removably positioned within and having sides defined by said tray frame, said tray member further including
   outer margins which overlap and rest upon the upper edges of said tray frame,
   a plurality of handle means provided in spaced relationship to one another about the outer margins of said tray member,
   a relatively rigid central portion, and a flexible, relatively narrow, reinforcing strip member extending from an outer margin of said tray member to said relatively rigid central portion, whereby said tray member may be removed by grasping two or more of said handle means and bringing them together to thereby form a bag-like configuration having a discharge spout and animal excreta deposited thereon discharged from said bag through said spout.

2. An animal commode as defined in claim 1, including porous platform means removably mounted within said tray frame and adapted to frictionally engage the outer margin of said tray member which overlaps said tray frame to thereby hold said tray member in place, said platform means adapted to carry the weight of an amimal, to receive solid and fluid animal excreta and to pass the fluid excreta to said tray member.

3. An animal commode as defined in claim 2, wherein said porous platform means comprises:
a rigid support frame;
a screen member secured to and extending across the uppermost surface of said support frame; and
a plurality of leg members secured to the bottom surface of said tray member;
said platform frame adapted to be telescopically slidably received within said tray frame so as to frictionally engage the outer margins of said tray member overlapping said tray frame.

4. An animal commode as defined in claim 1, including a base member carrying said tray frame,
said base member having upwardly extending side and end walls receiving said tray frame therebetween.

5. An animal commode as defined in claim 4, including
at least one end shield wall extending upwardly from the uppermost horizontal plane defined by said tray member; and
at least one of said end walls of said base member having means for removably mounting said end shield wall thereto and in a generally vertical plane.

6. An animal commode as defined in claim 5, including
at least one side shield wall extending upwardly from the uppermost horizontal plane of said tray member; and
means removably joining said side shield wall to said at least one end shield wall.

7. An animal commode as defined in claim 5, wherein said at least one end shield wall includes a depending, inclined flange member extending across the width of the interior surface of said wall and is adapted to extend over the rim of said tray member and said platform means.

8. An animal commode as defined in claim 6, including a removable top member adapted to be slidably received over the upper edges of said side and end shield walls.

9. An animal commode as defined in claim 6, wherein said side shield wall includes: first and second trough members formed integrally with the inner surface thereof and extending across the width of said side shield wall in vertically spaced relation; and first and second trough members provided on the outer surface thereof and extending across the width of said side wall.

10. An animal commode as defined in claim 9, wherein the margin of said commode opposite said side shield wall is open so as to define a passage int and from said platform means.

11. An animal commode as defined in claim 7, wherein orifices are provided in said end shield wall immediately above and extending along the base of said flange member; and including a first trough member formed integrally with the outer surface of said end shield wall and extending across the width thereof generally parallel to said flange member, the bottom of said first trough member communicating with said orifices.

12. An animal commode as defined in claim 11, including a dependent flanged support element integrally connected to the outer surface of said end shield wall below and parallel to said first trough member and extending across the width of said end shield wall to brace said end shield wall in an upright state, said support being inclined outwardly and terminating in a second trough member extending across the width of said end shield wall and disposed along the distal end of said support.

13. A commode for use by domestic pets adapted for convenient assembly, disassembly and portability, comprising:
a plurality of flat base elements in abutment with one another along their inner margins to provide the assembly with a continuous floor;
vertically disposed slots integrally mounted upon said base elements at the opposite ends thereof having end shield walls slidably received therein so as to be mounted within said slots in vertically disposed relationship to said base elements;
a rigid removable frame the periphery of which defines a walled enclosure resting upon said base elements and which is in slidable engagement with the guide means thereof to provide for movement of said base elements towards and away from each other in a single plane;
the end margins of said frame running parallel to said end shield walls and disposed interiorly thereof, the remaining lateral margins of said frame coinciding approximately with the outer lateral borders of said base members;
a liquid-impervious tray member having sides defined by said frame, the margins of said tray overlapping and resting upon said lateral and end margins of said frame;
a platform comprising
a screen,
a rigid peripheral support element for said screen to which support the margins of said screen are attached,
a plurality of legs mounted in fixed relation to said platform support and extending from the bottom thereof, said legs abutting the interior surface of said dished tray adjacent its outer perimeter;
said rigid support element of said platform being disposed in telescopic engagement within said frame and in direct contact with said sides of said tray defined by said frame; and
a side shield wall mounted between said end shield walls and abutting the outer margin of said tray overlapping said frame and conforming to the margin defined by said frame, said side shield wall being hingedly connected to the corresponding lateral margin of each of said end shield walls.

14. A commode as defined in claim 13 wherein the conformation thereof is quadrangular.

15. A commode as defined in claim 13 wherein said tray member is contoured to fit within the frame and platform provided.

16. A commode as defined in claim 14 wherein the conformation of said commode is rectangular.

17. A tray for use in an animal commode or the like, comprising:

a thin, generally flat member formed of a flexible sheet material;

said flat member including a relatively rigid central portion, and a flexible, relatively narrow, reinforcing strip member extending from an outer margin of said flat member to said relatively rigid central portion;

a plurality of handle means provided in spaced relationship to one another about the outer margins of said flat member;

said handle means being adapted to be brought together at a common point generally above said relatively rigid central portion;

whereby, when two or more of said handle means are brought together at said common point, said flat member is formed into a bag-like configuration having a discharge spout, said discharge spout being formed by said reinforcing strip member and the adjacent outer margins of said flat member, and said relatively rigid central portion forms the bottom of said bag-like configuration.

* * * * *